(12) United States Patent
Mott

(10) Patent No.: US 7,993,448 B2
(45) Date of Patent: Aug. 9, 2011

(54) CEMENT-CONTAINING COMPOSITION FOR USE WITH ALKALI-RESISTANT FIBERGLASS AND POLES MADE THEREFROM

(75) Inventor: John R. Mott, Walkersville, MD (US)

(73) Assignee: Specialty Composites, LLC, Roswell, GA (US)

( * ) Notice: Subject to any disclaimer, the term of this patent is extended or adjusted under 35 U.S.C. 154(b) by 754 days.

(21) Appl. No.: 11/989,423

(22) PCT Filed: Jul. 28, 2006

(86) PCT No.: PCT/US2006/029422
§ 371 (c)(1),
(2), (4) Date: Jan. 25, 2008

(87) PCT Pub. No.: WO2007/016347
PCT Pub. Date: Feb. 8, 2007

(65) Prior Publication Data
US 2009/0101275 A1    Apr. 23, 2009

Related U.S. Application Data

(60) Provisional application No. 60/703,460, filed on Jul. 29, 2005.

(51) Int. Cl.
*C04B 14/42*     (2006.01)

(52) U.S. Cl. ........ 106/644; 106/718; 106/724; 428/364; 428/404

(58) Field of Classification Search .................. 428/404, 428/364; 106/644, 718, 724
See application file for complete search history.

(56) References Cited

U.S. PATENT DOCUMENTS

| | | | |
|---|---|---|---|
| 4,793,861 A | | 12/1988 | Sohm |
| 4,975,396 A | | 12/1990 | Thiery |
| 6,027,561 A | * | 2/2000 | Gruber et al. ................. 106/718 |
| 6,653,373 B2 | | 11/2003 | Garrett et al. |
| 2004/0138346 A1 | | 7/2004 | Garrett et al. |
| 2007/0125273 A1 | * | 6/2007 | Pinto ............................ 106/638 |

\* cited by examiner

*Primary Examiner* — Paul Marcantoni
(74) *Attorney, Agent, or Firm* — Clark & Brody

(57) ABSTRACT

A cement-containing composition, and in particular to a sand free composition employing effective amounts of cement, a superplasticizer, a metakaolin clay, an acrylic based co-polymer, and water, and which is especially adapted for use in manufacturing poles.

13 Claims, No Drawings

CEMENT-CONTAINING COMPOSITION FOR USE WITH ALKALI-RESISTANT FIBERGLASS AND POLES MADE THEREFROM

This application is the national stage entry of International Application Number PCT/US2006/029422, filed Jul. 28, 2006, which was published in English, and claims priority of U.S. Provisional Application No. 60/703,460, filed Jul. 29, 2005.

TECHNICAL FIELD

The present invention is directed to a cement-containing composition, and in particular to a sand free composition employing effective amounts of cement, a superplasticizer, a metakaolin clay, an acrylic based co-polymer, and water, and which is especially adapted for use in manufacturing poles.

BACKGROUND ART

In the prior art, the use of glass fiber reinforced concrete (GFRC) as a building material is well known. Typically this material is made up of a composite that is reinforced with alkali-resistant glass fibers. The matrix material is made up of cement, sand, an acrylic based co-polymer, e.g., a styrene-butadiene polymer, known in the trade as Forton®, water, and other components such as plasticizers, silica fumes, and metakaolin clay. The typical amount of the acrylic-based co-polymer is around 14% by weight, which equates to about 7% wt of solids since the polymer is roughly 50% water. The durability of the composite is greatly improved through the use of the acrylic based co-polymer. This polymer penetrates into the inter-filamentary gaps of the glass fiber bundles (due to capillary action) and disperses throughout the entire matrix between the cement and sand particles. When the mortar dries sufficiently, through evaporation and the start of hydration, the polymer particles will adhere to each other, resulting in a cohesive polymer film, which is uniformly spread throughout the reinforced matrix, thus coating the sand, cement, and glass fibers. This polymer films acts as a barrier to further evaporation, the barrier effectively sealing the composite to retain the water of hydration, and a need for a wet cure is eliminated.

Metakaolin clay is used in GFRC to enhance the durability, strength, and workability. Plasticizers are used to wet all of the dry cement and sand particles, thereby reducing chemically-uncombined water and the problems that the presence of this water may have on the finished product.

While GFRC provides a totally acceptable product in many applications, it does suffer from the problem of low compressive and flexural strength, and this problem is magnified when the GFRC is used in structures needing these properties. Accordingly, a need exists for matrix compositions reinforced by glass fiber that exhibit improved properties, and particularly flexural strength. The present invention satisfies this need by providing a cement-containing and sand free composition employing effective amounts of cement, a superplasticizer, a metakaolin clay, an acrylic-based co-polymer, and water, which is especially adapted for use in manufacturing poles.

SUMMARY OF THE INVENTION

It is a first object of the present invention to provide an improved cement-containing composition as a matrix for the incorporation of alkali-resistance glass fibers.

Another object of the present invention is a composite material of the improved cement-containing composition and alkali-resistant glass fibers.

One other object of the present invention is a composite material useful for making poles, and particularly poles adapted to support utilities and the like.

Other objects and advantages will become apparent as a description of the invention proceeds.

In satisfaction of the foregoing objects and advantages, the present invention provides a cement-containing composition comprising:
  a) an effective amount of cement for imparting strength;
  b) an effective amount of a metakaolin clay for imparting toughness and long term durability;
  c) an effective amount of a superplasticizer for imparting good fluidity with a minimal amount of required water;
  d) an effective amount of a wet cure eliminator such as an acrylic-based copolymer for imparting long term durability and improved flexural strength;
  e) with the balance water;
  f) wherein the composition is sand free.

The invention also entails poles made of the cement composition and alkali-resistant glass, and methods of making wound poles using alkali-resistant glass, wherein the cement composition recited above is used for the matrix material of the pole.

DETAILED DESCRIPTION OF THE PREFERRED EMBODIMENTS

The present invention offers significant advantages of other known GFRC in that significant improvements are seen in terms of mechanical properties, and especially flexural strength.

In one mode of the invention, a cement-containing composition is provided that contains effective amounts of cement, an acrylic-based co-polymer as a styrene-butadiene copolymer, a superplasticizer, a metakaolin clay, water, and optionally an accelerator.

The cement can be any type of cement, but a preferred cement is a Portland cement. Portland cement is a type of cement consisting of a closely controlled chemical combination of oxides of calcium, silicon, aluminum, iron, and small amounts of other ingredients to which gypsum is added in the final grinding process to regulate its curing time. The amount of cement to be used can vary depending on a given structural application. The amount used is effective for providing sufficient strength when combined with the alkali-resistant fiber glass and other components. Preferred amounts include up 70% by weight, with more preferred ranges including 50-65%, and a target of around 63.3%. It should be understood that reference to weight percent, unless otherwise noted, is based on the overall weight of the matrix material as would be used, i.e., not a dry basis weight. While the particle size distribution of the cement can vary, the cement should have a very fine particle size to minimize the porosity of the finished product. An example of a typical particle size would be 85-95% less than 45 microns, 70% less than 20 microns, and 40% below 10 microns.

The metakaolin clay used as part of the composition is a highly reactive alumina-silicate ultrafine pozzolan that enhances the compressive strength, reduces chloride permeability and helps control alkali-silica reactivity and efflorescence, and it is used in an effective amount to accomplish these aims. The presence of the metakaolin is advantageous in that it causes the free lime given off during hydration of the cement reaction to form a cementious material that adds strength and impermeability to the resulting structure. Without the metakaolin, the free lime would readily leach away. While virtually any metakaolin clay can be used, a preferred type is Metamax®, which is manufactured by Engelhard Corporation, located in Iselin, N.J. A preferred amount of metakaolin ranges between 9 and 26% by weight, with a more preferred amount being 11.5 to 15.5%. A target content would be around 12.67%. It is also preferred that the particle size of the metakaolin matches the particle size of the cement.

The cement matrix to be combined with the alkali-resistant glass fibers should have a low enough viscosity so that it readily wets the alkali-resistant glass fibers during incorporation of the fibers into the matrix. The cement also needs a low enough water content to have a high cured strength. To achieve the low viscosity and low water content simultaneously, a superplasticizer is employed. The superplasticizer is used in an effective amount to wet any dry particles of the composition and reduce the need to add excessive amounts of water, and risk leaving free water in the composition and possible weakness to the thus-produced product. Virtually any known superplasticizer can be employed as part of the composition with a preferred one being a third generation high-range water reducer known as ADVA 170, which is a carboxylated polyether available from W. R. Grace, and is approximately 70% water. The superplasticizer is used in a preferred range of 0.63 to 1.9%, with a more preferred range being between 1 and 1.4%, and a target being around 1.22%.

In addition to the use of the water reducer or superplasticizer, a compound that effectively eliminates the need for a wet cure is employed by retaining water in the composition through the curing interval. One example of this type of a wet cure eliminator is acrylic-based co-polymers as are known in the art for this purpose. The acrylic-based co-polymer provides significant improvement in the long-term durability of the finished part, especially the maintenance of the long-term modulus of rupture and the flexural strain to failure property. A preferred acrylic-based co-polymer as Forton VF 774, which is a styrene-butadiene co-polymer, which is readily available commercially from W. R. Grace. The effective amount of the acrylic-based co-polymer should be at least 6.5%, which is an amount when added to the matrix removes the need for a wet cure, and improves at least the flexural strength of the thus-produced product over conventional GFRC materials. More preferred ranges for the acrylic co-polymer include 4.5 to 12.0%, with most preferred ranges being 8.25 to 9.5%. A target amount can be 8.87%. It should also be understood that other prior art wet cure eliminating compounds which eliminate the seven (7) day wet cure required to achieve the maximum strengths of concrete and provide significant improvements in the long-term durability of the finished product can be used as part of the inventive matrix.

An accelerator can be employed as part of the composition if so desired. While any known accelerator for curing cement can be employed, a preferred accelerator is calcium chloride. When using calcium chloride, it is preferred to use it in a solution made up of 30 by weight of the calcium chloride. Based on water weighing 8.30 lbs./gal, 10 pounds of calcium chloride would be used for 4 gallons of water to make a 30 wt. % solution. While the calcium chloride can be made into solution in any manner, a preferred technique is to add the calcium chloride slowly to the water and then mix until the calcium chloride dissolves into solution. A preferred range of the accelerator would be between 0.5 and 5% by weight of the matrix material. While a chloride is exemplified as one accelerator, a non-chloride accelerator can also be employed. These types of accelerators are often employed as curing agents if iron is present in the material being cured. Since the inventive matrix does not contain iron, a chloride-containing accelerant can be used. This is particularly advantageous since these types of accelerants are inexpensive when compared to those that do not contain chlorides.

Water makes up the balance of the composition, and is determined according to the amount necessary for curing of the cement. The water content can be derived from the water contained in the acrylic co-polymer and the superplasticizer. Alternatively, water can also be derived from the accelerator if used when formulating the composition. The theoretical amount of water required to affect the cure is insufficient to allow for use of the matrix material in coating alkali-resistant glass fibers for various applications; even those as simple as casting. Thus, excess water is needed to attain the proper fluidity of the matrix material to allow for the proper positioning or placement of the glass fibers and forming of the finished product. On the other hand, the water content needs to be as low as possible to permit a low porosity in the cured part, and this low porosity, i.e., higher density, translates into a higher yield strength. The total water content should allow for the water to be drawn up immediately into the capillary voids between the fiber strands in the glass tows. When the water is drawn off, the matrix on the tows can still maintain its proper behavior in making the finished product.

In a typical pole making use, the matrix material is placed in a container to form a bath. The alkali-resistant glass fibers are passed through the bath and then wound on a mandrel to form a pole. The matrix needs to be fluid enough to be drawn quickly onto the glass strands as they pass rapidly through the bath, and yet not create fluid drag. A desired consistency is one that resembles latex paint. The bath also needs good lubricity to permit the glass fibers to pass through the bath and be coated while at the same time not abrading and/or breaking the glass strands, and this is achieved by the use of the inventive matrix material.

One advantage of the water-polymer based fluid matrix material is that it is thixotropic in nature. That is, it behaves like a gel in its static condition, but when shear forces are imposed upon it, the composition behaves like a thin liquid. This property is advantageous since the shear forces are involved when combining the glass fibers with the matrix. More specifically, shear forces are present when the glass fibers would move through the matrix, and these forces cause the composition to act as a thin liquid. This maximizes the contact and wetting between the glass fiber and the matrix, thus improving the end product. By being thixotropic, the matrix material maintains good fluidity when there is movement, e.g., glass strands moving through a bath, and at the same time, has good stability in a quiescent state, which is important when the fibers and matrix material are finally positioned, e.g., wound on a mandrel.

As explained collectively above, a number of factors contribute to the improved performance of the matrix material in terms of wetting an alkali-resistant glass fibers and maintaining the matrix material in the proper state during the curing process when forming a glass fiber reinforced finished product. These factors include the fine particle size of the cement and metakaolin clay, the absence of sand, the effective levels of the water reducer or superplasticizer, and cure-affecting acrylic-based co-polymer, and total water content.

The following Tables I and II show an example of a typical composition for use as a matrix for alkali-resistant glass fibers. Table 1 shows the materials based on a weight percentage of cement. For example, for every hundred pounds of cement used, 20 pounds of clay would be used. Table II shows a formulation including the weight of cement, both on a total weight basis, and a dry weight basis. Table III shows the breakdown between water and total solids, as well as the ratio of water to solids and water to cement. It should be noted that the water to solids ratio is lower than that typically found in GFRC materials, and this lower amount of water contributes to improved performance because of the higher density in the finished product due to the resultant reduced porosity as excess water is evolved.

TABLE I

| Material | Content (wt % based on amt of cement) |
|---|---|
| Metakaolin clay | 20.00 |
| ADVA (superplasticizer)[1] | 1.93 |
| FORTON (acrylic-based co-polymer)[2] | 14.00 |
| Water | 19.12 |
| Accelerator (optional)[3] | 0.00 |

[1]30% water
[2]49% water
[3]70% water

TABLE II

| Material | Weight (lbs.) | % as is | Dry Weight (lbs.) | % dry basis |
|---|---|---|---|---|
| Cement | 316.63 | 63.33 | 316.63 | 77.8 |
| Metakaolin clay | 63.33 | 12.67 | 63.33 | 15.6 |
| ADVA[1] | 6.11 | 1.22 | 4.28 | 1.1 |
| FORTON[2] | 44.33 | 8.86 | 22.61 | 5.53 |
| Accelerator[3] | 0.00 | | | |
| Added Water | 69.60 | 13.92 | | |
| Total weight (lbs.) | 500.00 | | 406.85 | |

[1]30% water
[2]49% water
[3]70% water

TABLE III

| 500 Lb mixture | |
|---|---|
| Total water weight (lbs.) | 95.60 |
| Total Solids (lbs) | 404.40 |
| Water/solids ratio | 0.2364 |
| Water/cement ratio | 0.3019 |

The composition is especially useful in the manufacture in poles wherein the poles are formed by a winding process. In winding process known in the prior art, the glass fibers are coated with the matrix composition, usually by passing through a bath of the composition, and then wound on a mandrel. One example is shown in U.S. Pat. No. 5,880,404 to Stanley et al., which is herein incorporated by reference in its entirety. In this patent, the glass fibers are wound under tension about a tapered mandrel while supplying the inorganic cement. Using the composition of the present invention for wound pole construction results in an optimum combination of flexural and compressive strength.

As such, an invention has been disclosed in terms of preferred embodiments thereof which fulfills each and every one of the objects of the present invention as set forth above and provides a new and improved sand free cement-containing composition that is ideally suited for use with alkali-resistant glass fibers in construction applications, particularly poles.

Of course, various changes, modifications and alterations from the teachings of the present invention may be contemplated by those skilled in the art without departing from the intended spirit and scope thereof. It is intended that the present invention only be limited by the terms of the appended claims.

I claim:

1. A pole comprising glass fibers coated in a cement-containing composition comprising:
 a) cement for imparting strength;
 b) a metakaolin clay for imparting toughness and long term durability;
 c) a superplasticizer for imparting good fluidity;
 d) a wet cure eliminator comprising an acrylic-based copolymer for imparting long term durability and improved flexural strength;
 e) with the balance water;
 f) wherein the composition is free of sand.

2. The pole of claim 1, said composition further comprising an accelerator.

3. The pole claim 2, wherein the accelerator is calcium chloride.

4. The pole of claim 1, wherein the amount of cement ranges between 50 and 65% by weight of the composition.

5. The pole of claim 1, wherein the amount of metakaolin ranges between 9 and 26% by weight of the composition.

6. The pole of claim 1, wherein the wet cure eliminator is an acrylic co-polymer as a butadiene-polystyrene dispersion.

7. The pole of claim 6, wherein the amount of the butadiene-polystyrene dispersion ranges between 4.5 and 12.0% by weight of the composition.

8. The pole of claim 1, wherein the superplasticizer is a carboxylated polyether.

9. The pole of claim 8, wherein the carboxylated polyether ranges between 0.32 and 3.2% by weight of the composition.

10. The pole of claim 1, wherein the cement ranges between 50 and 65% by weight of the composition, the metakaolin clay ranges between 9 and 26% by weight of the composition, the superplasticizer is a carboxylated polyether ranging between 0.63 and 1.9% by weight of the composition, the acrylic co-polymer is a butadiene-polystyrene dispersion ranging between 4.5 and 12.0% by weight of the composition.

11. The pole of claim 10, further comprising calcium chloride as an accelerator ranging between 0.5 and 5% by weight of the composition.

12. The pole of claim 1, wherein the particle size of the cement generally matches the particle size of the metakaolin clay.

13. The pole of claim 2, wherein the accelerant is a non-chloride-containing accelerant.

* * * * *